Patented Mar. 15, 1938

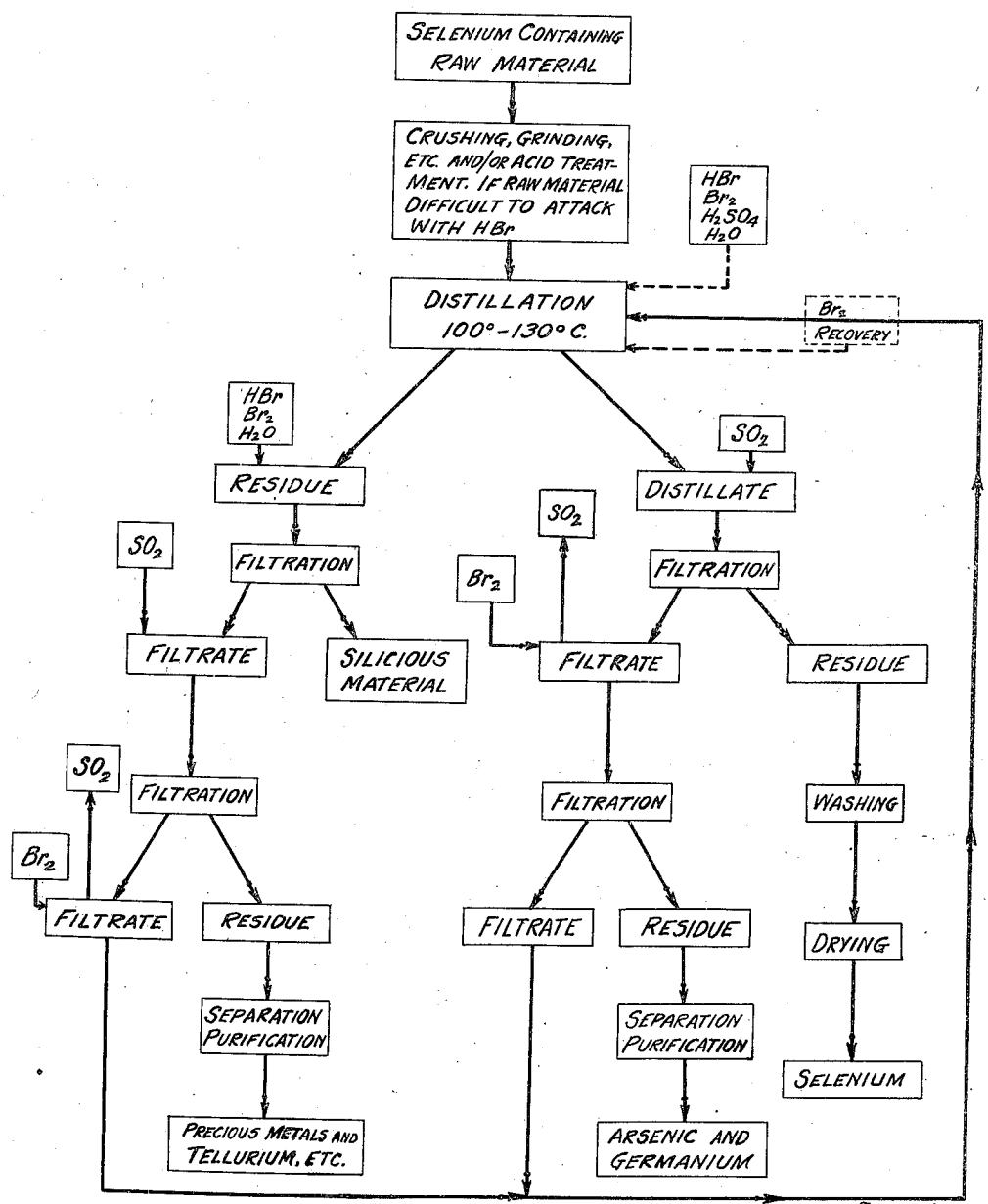

2,111,112

UNITED STATES PATENT OFFICE 2,111,112

RECOVERY OF SELENIUM

Horace C. Dudley, Springfield, Mo.

Application November 20, 1936, Serial No. 111,963

9 Claims. (Cl. 23—209)

This invention relates to the recovery of certain elements from mixtures or compositions which contain them, and particularly to the recovery of selenium from such materials as shales, rocks, dusts, ores, ore concentrates, sludges, and certain vegetable materials.

At the present time, the price of selenium is quite high and no method is known by which it may be cheaply produced in large quantities. For analytical purposes selenium has been separated from other elements by distillation with concentrated hydrobromic acid, but this method was not adapted for large scale production of the element because the cost of the hydrobromic acid used made the cost of the final product too high. For a detailed description of this method reference may be had to an article that appears in vol. 6 of "Analytical edition, Industrial and Engineering Chemistry," page 274, July 15, 1934, and is entitled "Determination of selenium and arsenic by distillation". The present inventor was one of the authors of this article.

According to the present invention, it now appears that the general method mentioned above can be revised and improved so as to make it applicable to the commercial production of selenium at a much lower price than has heretofore been possible and in a state of exceptionally high purity. Since selenium is now used in synthetic resins, glass, rubber, ceramics, pigments, ink, and many other industrial products, the benefit to be derived from producing it at a lower price and yet in a state of high purity is obvious.

As a starting material, the present invention may utilize practically anything that contains the desired element. Probably the best source of selenium is the sludge recovered from electrolytic baths used in the electrolytic refining of zinc and copper. Other sludges, such as those from sulphuric acid plants, are also good sources, as are flue dusts, particularly cottrell precipitator dusts, from smelters, refining plants or roasting plants. Still other material such as rocks, shales, ores, ore concentrates, and even vegetable materials can often be used to advantage.

The first step in the process, according to the present invention, consists in getting the initial material into a state which is fine enough so that it will get good contact with the reagents. Preferably, if it is not already in a finely divided state, it is ground to a fineness of around 40 mesh or finer. Next, if the material is of a silicious nature or is otherwise hard to attack by the use of such reagents as hydrobromic acid, it is treated with a sufficient amount of nitric acid or with a sufficient amount of a mixture of nitric and sulphuric acids to decompose it, so that it can thereafter be more readily attacked by the reagents to follow. Ordinarily, this preliminary treatment may be made by adding a sufficient quantity of nitric or nitric and sulphuric acids to react with all of the material present and heat will then be applied until all of the nitric acid is driven off. The residue will then be treated in the same manner as a less refractory material would originally be treated.

The treated refractory material or the untreated less refractory material is next acted upon by a sufficient quantity of hydrobromic acid, preferably of 40 to 55% concentration, to react with all of the selenium present. In addition, if heavy metal selenides are known to be present, a small quantity of bromine is added, and preferably a quantity of sulphuric acid is also added, which quantity is sufficient to neutralize any basic materials that may be present and furnish a moderate excess of sulphuric acid.

The mixture so prepared is then distilled to remove the hydrobromic acid and with it the selenium, which is believed at that stage of the process to be in the form of selenium bromide. This distillation takes place at from 100° C. to 130° C. and the resultant distillate, if the distillation has been carried to completion, will contain practically all of the hydrobromic acid, any bromine that may have been present, and practically all of the selenium. It will also contain any arsenic and germanium that may be present. The residue from the distillation will contain all other non-volatile and inorganic materials present including any tellurium, gold, silver, platinum, and other precious or semi-precious metals that may be present.

In order to recover the selenium from the distillate, the distillate will preferably be saturated with sulphur dioxide, starting at a temperature of about 25° C. or somewhat above and rising to around 75° C. during the treatment due to the heat of reaction evolved. The temperature rise will depend upon the amount of selenium and free bromine present in the distillate prior to the reducing reaction. This treatment will precipitate the selenium which may then be separated by a process of decantation, filtering and washing with water. The arsenic and germanium will remain in the filtrate and can be recovered therefrom by the usual methods for the separation of these materials. Instead of using sulphur dioxide to precipitate the selenium, other similar reducing agents can be used such, for example, as sodium sulphite, or sodium acid sulphite. Even hydrochloric acid will act to partially precipitate the selenium and can be used, although less desirable.

Having recovered the selenium, as much as will of the sulphur dioxide may be allowed to escape from the filtrate, the remainder oxidized with bromine, and the filtrate reused in place of fresh hydrobromic acid, in the original treatment of the raw material. Since the process tends to produce hydrobromic acid and use bromine, it will occasionally be necessary to recover the bromine itself. To do this the filtrate may be neutralized with soda ash or lime and the bromine distilled off or replaced by chlorine. This provides a simple way in which the more costly reagents necessary for the present process may be easily recovered and by avoiding the expense of replacing these reagents, such an important saving is effected as to very materially lower the cost of producing the desired element.

In addition to producing selenium by the present process, tellurium, silver, gold, platinum, and other precious metals, if present, as they are in electrolytic sludges, may also be recovered from the residue resulting from the distillation. To make this recovery, hydrobromic acid, or a mixture of hydrobromic acid and bromine, are added to the residue in sufficient quantities so that they will pick up and dissolve all except the silicious matter therein. The silicious matter is then filtered out, and the filtrate treated with sulphur dioxide to precipitate the metals mentioned. Tellurium does not precipitate completely at all acid concentrations and by proper manipulation may be kept in solution until the other metals have been precipitated and removed. The tellurium may then be precipitated by changing the acid concentration and its separation from the other metals thus effected. In general, tellurium will precipitate best in the presence of 20 to 40% of hydrobromic acid. Ordinarily after the other metals have been precipitated, the addition of a little water will cause the precipitation of the tellurium to be completed. When all of the precipitated metals are filtered from the liquid together, and are then melted, the tellurium oxidizes and sublimes, being recovered as tellurium oxide. The remaining metals are recovered by the usual methods of separation.

In order to furnish a more complete basis for a thorough understanding of all the details of the present invention, the following examples are given with the understanding that they are but examples, and not to be construed as limiting the scope of this invention. A diagrammatic showing of the general recovery method is contained in the accompanying flow chart which will further serve to set forth the invention in conjunction with the description and examples.

*Example 1.*—To 5 pounds of a mixture of crude selenium, mixed silicates, tellurium, and many other metals, 10 pounds of 48% hydrobromic acid, 2 pounds of 94% sulphuric acid, 2 pounds of water, and 1 pound of bromine were added. The resultant mixture was distilled at 100° to 130° C. until test portions of the distillate showed that no more selenium was being distilled over. The distillate was then saturated at 25° C. with sulphur dioxide, whereupon the selenium precipitated, and was separated by carefully decanting, filtering, and washing with water. When dry, it was found that the selenium was of better than 99% purity.

*Example 2.*—From 5 pounds of sludge from the electrolytic refining of copper, the selenium was recovered in exactly the same manner as described in the above example except that the mixture was preliminarily treated with three pounds of nitric acid and three pounds of sulphuric acid by heating it with these reagents until the nitric acid was all distilled off. The residue remaining after the distillation with hydrobromic acid (as in Example 1) was then treated to recover the precious metals therein by adding thereto 10 pounds of 48% hydrobromic acid and 1 pound of bromine and filtering through asbestos to remove the silicious matter. The precious metals were thereafter precipitated by saturating the solution with sulphur dioxide, starting at around 25° C. and allowing the temperature to rise during the treatment, and the precipitated metals were thereupon separated by decantation, filtration, and washing with water. The recovered metals were heated, the tellurium oxiding to tellurium oxide, subliming and being recovered in a small cottrell type precipitator, and the remaining melt being divided into its constituent elements by the usual metallurgical methods. The filtrate from the precious metal separation was recovered in the same manner as the filtrates from the selenium separation, namely, by allowing all of the sulphur dioxide that would to escape, oxidizing the remainder with bromine, and reusing as before.

Although examples have been given of specific embodiments of the present invention, it is to be understood that the invention is not limited by these embodiments but is capable of modification by those skilled in the art without departing from the major principles thereof.

I claim:

1. A cyclic process for the recovery of selenium that comprises distilling a selenium-containing material with hydrobromic acid, adding a reducing material that will furnish sulphur dioxide to the distillate to precipitate the selenium, removing the selenium, adding sufficient bromine to the distillate to oxidize the reducing material, and distilling further quantities of selenium-containing material with the treated distillate.

2. A cyclic process of recovering selenium that comprises distilling a mixture of a selenium-containing material, hydrobromic acid and sulphuric acid, adding a reducing agent that will furnish sulphur dioxide to the distillate to precipitate the selenium, separating the precipitated selenium, adding sufficient bromine to the distillate to oxidize any remaining reducing agent, and distilling further quantities of selenium-containing material with the treated distillate.

3. A cyclic process of recovering selenium that comprises distilling a mixture of a selenium-containing material, hydrobromic acid and sulphuric acid, at a temperature of around 100–130° C., adding a reducing agent that will furnish sulphur dioxide to the distillate to precipitate the selenium, separating the precipitated selenium, adding sufficient bromine to oxidize any reducing agent remaining in the distillate, and distilling further quantities of selenium-containing material with the treated distillate.

4. A cyclic process of recovering selenium that comprises distilling a mixture of a selenium-containing material, hydrobromic acid and sulphuric acid, adding a reducing agent that will furnish sulphur dioxide to the distillate to precipitate the selenium, separating the precipitated selenium, adding sufficient bromine to the distillate to oxidize any remaining reducing agent, distilling further quantities of selenium-containing material with the treated distillate, and recovering precious metals from the still residue.

5. A cyclic process for the recovery of selenium that comprises distilling a selenium-containing material, bromine and hydrobromic acid, adding a reducing material that will furnish sulphur dioxide to the distillate to precipitate the selenium, separating the precipitated selenium, adding sufficient bromine to the distillate to oxidize any remaining reducing material and distilling further quantities of selenium-containing material with the treated distillate.

6. A cyclic process of recovering selenium that comprises distilling a mixture of a selenium-containing material, bromine, hydrobromic acid and sulphuric acid, adding a reducing agent that will furnish sulphur dioxide to the distillate to precipitate the selenium, separating the precipitated selenium, adding sufficient bromine to the distillate to oxidize any remaining reducing agent, and distilling additional quantities of selenium-containing material with the treated distillate.

7. A cyclic process for the recovery of selenium that comprises distilling a selenium-containing material, bromine, and hydrobromic acid, adding sulphur dioxide to the distillate to precipitate the selenium, separating the selenium, adding sufficient bromine to the remaining distillate to oxidize any remaining sulphur dioxide, and distilling further quantities of selenium-containing material with the treated distillate.

8. A cyclic process for the recovery of various elements of compositions containing them that comprises distilling such a composition with hydrobromic acid to remove any selenium present, adding a reducing agent that will furnish sulphur dioxide to the distillate to precipitate the selenium, adding hydrobromic acid and bromine to the residue, filtering the mixture so obtained to remove silicious material, saturating the filtrate with sulphur dioxide to precipitate the precious and semi-precious metals, separating said metals from the filtrate, treating the residual distillate and filtrate with sufficient bromine to oxidize any sulphur dioxide or other reducing agent present, and employing the treated materials in the place of fresh hydrobromic acid in the same process.

9. A cyclic process for the recovery of certain elements from compositions that contain them that comprises distilling such a composition with hydrobromic acid and sulphuric acid, adding sulphur dioxide to the distillate to precipitate any selenium that is present, separating the selenium, treating the residue from the distillate with bromine and hydrobromic acid to dissolve any precious or semi-precious metals therein, filtering the resultant mixture to remove silicious material, treating the filtrate with sulphur dioxide to precipitate the precious or semi-precious metals, separating these metals from the filtrate, treating the filtrate and the distillate with sufficient bromine to oxidize any sulphur dioxide that is present, and employing the so-treated filtrate and distillate in the place of fresh hydrobromic acid in the same process.

HORACE C. DUDLEY.